United States Patent
Peck

(10) Patent No.: US 7,282,183 B2
(45) Date of Patent: Oct. 16, 2007

(54) ATMOSPHERIC CONTROL IN REACTION CHAMBERS

(75) Inventor: Bill J. Peck, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 677 days.

(21) Appl. No.: 10/035,788

(22) Filed: Dec. 24, 2001

(65) Prior Publication Data

US 2003/0118482 A1 Jun. 26, 2003

(51) Int. Cl.
B01J 19/00 (2006.01)
B01J 4/00 (2006.01)

(52) U.S. Cl. .................. 422/129; 422/131

(58) Field of Classification Search ........... 422/129, 422/130, 131, 50, 99, 104
See application file for complete search history.

(56) References Cited

U.S. PATENT DOCUMENTS

| | | | |
|---|---|---|---|
| 4,650,698 A * | 3/1987 | Moriya et al. | 427/237 |
| 4,948,458 A | 8/1990 | Ogle | |
| 5,064,367 A * | 11/1991 | Philipossian | 432/253 |
| 5,195,888 A * | 3/1993 | Sharma et al. | 432/64 |
| 5,238,499 A | 8/1993 | van de Ven et al. | |
| 5,343,012 A | 8/1994 | Hardy et al. | |
| 5,472,672 A | 12/1995 | Brennan | |
| 5,474,796 A | 12/1995 | Brennan | |
| 5,529,756 A | 6/1996 | Brennan | |
| 5,590,537 A * | 1/1997 | Vogel | 62/51.1 |
| 5,609,826 A | 3/1997 | Cargill et al. | |
| 5,716,584 A * | 2/1998 | Baker et al. | 422/131 |
| 5,770,157 A | 6/1998 | Cargill et al. | |
| 5,810,942 A * | 9/1998 | Narayanswami et al. | 134/7 |
| 5,922,534 A | 7/1999 | Lichtenwalter | |
| 5,965,048 A * | 10/1999 | Powers | 219/411 |
| 5,981,733 A * | 11/1999 | Gamble et al. | 536/25.3 |
| 6,001,311 A | 12/1999 | Brennan | |
| 6,083,763 A | 7/2000 | Balch | |
| 6,251,195 B1 * | 6/2001 | Wagener et al. | 134/7 |
| 6,663,832 B2 * | 12/2003 | Lebl et al. | 422/64 |
| 6,790,620 B2 * | 9/2004 | Bass et al. | 435/6 |
| 6,846,454 B2 * | 1/2005 | Peck | 422/63 |
| 6,858,186 B2 * | 2/2005 | Hilson et al. | 422/104 |

FOREIGN PATENT DOCUMENTS

DE 4441690 A1 * 6/1996
JP 63296845 A * 12/1988

* cited by examiner

Primary Examiner—Glenn Caldarola
Assistant Examiner—Jennifer A. Leung

(57) ABSTRACT

Apparatus and methods are disclosed for controlling atmospheric characteristics inside a chamber. An apparatus comprises a mechanism for diffusively introducing pressurized gas into the apparatus, an outlet element in fluid communication with the mechanism, and a chamber in fluid communication with the outlet element. The outlet element and the chamber are disposed such that gas flow therethrough is substantially uniform. The chamber comprises a gas outlet and the outlet element comprises a plurality of openings. The apparatus may be employed in the manufacture of biopolymers on the surface of a support such as an array of biopolymer features on the support.

42 Claims, 2 Drawing Sheets

ATMOSPHERIC CONTROL IN REACTION CHAMBERS

BACKGROUND OF THE INVENTION

This invention relates to chambers for carrying out procedures wherein internal atmospheric conditions, such as, e.g., humidity, of the chamber are controlled. More particularly, the invention relates to devices for carrying out steps in the synthesis of a chemical compound. The invention has particular application in the manufacture of supports having bound to the surfaces thereof a plurality of chemical compounds, such as biopolymers, which are prepared on the surface in a series of steps.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship to, for example, disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, e.g., oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas or sites of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding will be indicative of the presence and/or concentration of one or more polynucleotide components of the sample.

The arrays may be microarrays created by in-situ synthesis of biopolymers such as polynucleotides, including oligonucleotides, and polypeptides or by deposition of molecules such as oligonucleotides, cDNA and so forth. In general, arrays are synthesized on a surface of a substrate by one of any number of synthetic techniques that are known in the art. In one approach to the synthesis of microarrays, an apparatus is employed that comprises a reaction chamber and a device for dispensing reagents to the surface of a substrate at discrete sites. A positioning system, which may be a robotic manipulator, moves the substrate to the chamber, in which at least a portion of the device for dispensing reagents is housed. Alternatively, the device for dispensing reagents may be moved in and out of the chamber. A controller controls the application of the reagents to the substrate according to predetermined procedures. The positioning system may comprise one or more stages for moving the substrate to various positions for the dispensing of reagents thereon. Positioning stages are typically comprised of x,y linear stages mated with theta rotational stages to provided the necessary degrees of freedom to undertake the required motions.

To produce arrays it is important to reproducibly perform reactions at a particular site without affecting adjacent sites. The reaction should approximate stoichiometry in producing the desired product. Since many of the reactions are performed stepwise, any failure during the synthesis results in the wrong product. The site for each reaction must be defined so that the reaction occurs in a rapid and efficient manner. Each step in the process should provide for a reproducible result and not interfere with the next stage or the reaction at a different site.

Since the arrays provide for a large number of different compounds, the process requires many steps. With oligonucleotides, an in situ synthesis is employed wherein each monomer addition involves a plurality of steps, so that the synthesis at each site involves the number of steps for each addition multiplied by the number of monomers in the oligonucleotide. In order to be able to produce arrays of oligonucleotides efficiently, automated systems are preferred to provide for the accurate placement of reagents, efficient reaction, close packing of different compounds and the indexing of individual oligonucleotides with a particular site in the array.

In situ syntheses generally require a controlled environment in the reaction chamber. For example, many syntheses require an anhydrous environment to avoid the destructive effects of exposing chemical reagents to humidity present in the ambient atmosphere. Typically, an anhydrous chamber is created by enclosing the device for dispensing reagents in a reaction chamber through which dry gas is purged. The gas is delivered into the reaction chamber by means of an inlet, usually a single inlet. Such techniques fail because of the generally unpredictable flow field that develops after introducing a point source of momentum into a large volume.

There is a need, therefore, for a chamber for carrying out reactions where a controlled environment may be maintained within the reaction chamber especially during the insertion and removal of devices into and out of the reaction chamber.

SUMMARY OF THE INVENTION

One embodiment of the present invention is an apparatus comprising a mechanism for distributing pressurized gas into the apparatus, an outlet element in fluid communication with the mechanism, and a chamber in fluid communication with the outlet element. The outlet element and the chamber are disposed such that gas flow therethrough is substantially unidirectional through the chamber. The chamber comprises a gas outlet and the outlet element comprises a plurality of openings.

Another embodiment of the present invention is an apparatus comprising a manifold comprising one or more compartments, an outlet element in fluid communication with the manifold, and a chamber in fluid communication with the outlet element. The chamber and the outlet element are disposed such that gas flow through the chamber is substantially unidirectional. The chamber comprises a gas outlet. Each of the compartments of the manifold is in fluid communication with a gas inlet for introducing pressurized gas into the apparatus. The outlet element comprises a plurality of openings therein. In one approach the outlet element is about 1 to about 1.5 inches thick and comprises about 10 to about 50 openings per square inch. In another approach the outlet element is relatively thin, that is, about 0.040 to about 0.125 inches thick, and the apparatus comprises a flow-straightening element disposed in fluid communication between the outlet element and the chamber.

Another embodiment of the present invention is an apparatus for manufacturing an array of biopolymers on a support. The apparatus comprises a manifold comprising at least two compartments, a perforated element in fluid communication with the manifold, a chamber in fluid communication with the perforated element, a device for dispensing reagents for synthesizing an array of biopolymer features on a support, and a mechanism for moving the support into and out of the chamber through an opening in a wall of the chamber. Each of the compartments of the manifold is in fluid communication with a respective gas inlet. The outlet element comprises about 10 to about 50 perforations per square inch. The chamber comprises a door in a wall thereof. At least a portion of the device for dispensing reagents is within the chamber. In one approach the perforated element is about 1 to about 1.5 inches thick and comprises about 10 to about 50 openings per square inch. In another approach the perforated element is relatively thin, that is, about 0.5 to about 1 inch thick, and the apparatus comprises a flow-straightening element disposed in fluid communication between the perforated element and the chamber.

Another embodiment of the present invention is a method for controlling the atmosphere in a reaction chamber. The method comprises introducing a gas into the reaction chamber, wherein the gas has a positive and substantially uniform unidirectional flow through the chamber, and allowing the gas to exit the reaction chamber through a gas outlet in a direction that is the same as the laminar flow.

Another embodiment of the present invention is a method for synthesizing a plurality of biopolymers on a support. The support is introduced into a reaction chamber, which has a positive and substantially uniform flow of gas through the reaction chamber. The gas exits the reaction chamber through a gas outlet in a direction that is the same as the substantially uniform flow. The surface of the support is activated for attachment of biopolymer precursors. The support and a dispensing system for dispensing reagents for the synthesis of the biopolymers are brought into a dispensing position relative to the activated surface. Reagents are dispensed to the support to form the array of discrete feature locations. The support and/or the dispensing system are removed from the relative dispensing position. Optionally, the above steps are repeated until the biopolymer is formed. The method has particular application to the in situ synthesis of an array of biopolymers on the surface of a support.

DETAILED DESCRIPTION OF THE INVENTION

Figure 1:
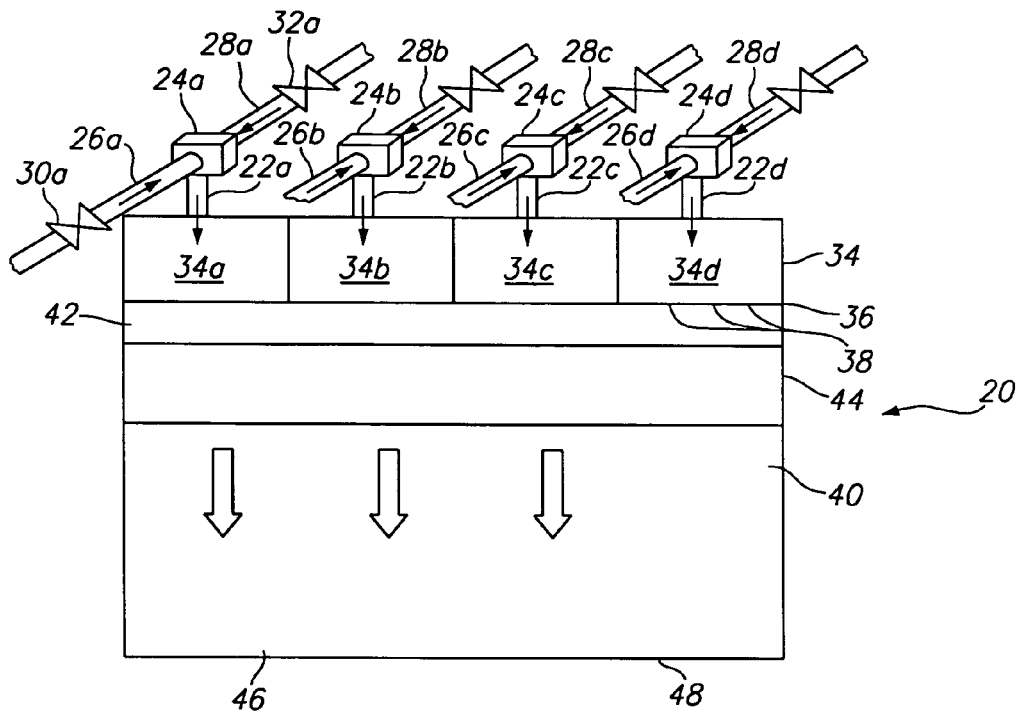
FIG. 1 is a schematic diagram depicting one embodiment of an apparatus in accordance with the present invention.

In its broadest aspect the present invention provides a reaction chamber in which the internal atmospheric characteristics of, or the internal environmental conditions within, the reaction chamber are controlled. The atmospheric characteristics include, for example, humidity, reactive gases, particulates and the like, of the ambient atmosphere inside the reaction chamber. In the present apparatus, a gas such as a dry gas is introduced under pressure into the reaction chamber in such a manner as to provide careful distribution and controlled uniform flow of the gas. Facile exiting of the dry gas is provided so that the gas is not allowed to stagnate or re-circulate within the reaction chamber, which can cause increases in the level of humidity and other conditions in the reaction chamber. In the present invention pressurized gas, usually from a point source, is distributed into a spatially uniform pressure field that ultimately results in a spatially homogeneous, laminar flow field. Flow control is also provided so that the flow field in the reaction chamber can be tuned to overcome resistance due to obstacles in the reaction chamber such as robotic manipulators or print head assemblies.

In one embodiment an apparatus in accordance with the present invention comprises a mechanism for introducing gas into the apparatus, an outlet element in fluid communication with the above mechanism and a chamber through which the gas flows. The outlet element comprises a plurality of openings therein. The outlet element may be designed to provide flow-straightening of the gas in the flow field or a flow-straightening element may be employed in fluid communication with the outlet element to achieve this result.

The mechanism for introducing gas into the apparatus is one that permits gas under high pressure to be distributed from a point source into a spatially uniform pressure field that results in a spatially homogeneous flow field. The gas is usually under a pressure of about 60 to about 80 pounds per square inch (psi), more usually, about 60 to about 80 psi before entering a volume flow meter, which permits the gas pressure within the reaction chamber to approximate atmospheric pressure. The point source is typically a hollow, usually, tubular, element having an inside diameter of about 0.06 to about 0.3 inches, usually about 0.125 to about 0.25 inches, typically, about 0.19 inches. The point source is connected to a supply of gas. It is important that the gas be inert to the components and conditions within the reaction chamber. The gas should be inert under the conditions of use in the present invention. Such gases include nitrogen, helium, noble gases, and the like, and mixtures thereof. Noble gases include, for example, argon, krypton, xenon, neon, and the like. For humidity control within the reaction chamber, the gas should have a water content that is less that about 1 parts per million (ppm) by volume, usually, less than about 0.1 ppm by volume. The nature and composition of the gas is determined by the particular atmospheric characteristic to be controlled.

Various mechanisms for diffusively introducing gas into the apparatus may be employed. In one approach the mechanism comprises one or more gas inlets and a manifold comprising one or more compartments. Each of the compartments is in fluid communication with a respective gas inlet. In general, the number of compartments is based on the level of pressure of the gas, and the size of the coupling chamber, and so forth. Usually, the number of compartments in the manifold is about 3 to about 6, usually about 4 to about 5 and can be scaled based on the dimensions of the apparatus. The main function of the compartments of the manifold is to slow the flow of incoming gas and to convert the kinetic energy (dynamic pressure) of the gas to a higher static pressure with a flow at a lower velocity distributed more uniformly over the outlet of the manifold. Typically, the flow of incoming gas is slowed by a factor of about 10 to 100.

In one approach gas is introduced into the compartments of the manifold using gas inlets that are in fluid communication with a gas inlet source that provides gas in a direction that is substantially normal to the direction in which the gas flows through the gas inlets and enters the manifold. By "substantially normal" is meant that the angle formed by the axis of the gas from the gas inlet source and the axis of gas flowing through the gas inlets into the respective compartments of the manifold is about 90 degrees. In one approach the gas inlet source comprises a gas inlet line that forms a junction such as, for example, a T-junction, and the like, with the gas inlet line leading to the manifold. Gas is introduced into the gas inlet source from both sides of the junction in such a manner that the gas flow from each side is in opposition to slow the gas before it enters the gas inlet on its way to the compartments of the manifold. This enhances energy dissipation of the gas within the compartments of the manifold.

The gas inlets are usually tubular, preferably, circular in cross-section, although other cross-sectional shapes such as, e.g., square or rectangular, may be employed. The gas inlets are usually valves fabricated from stainless steel and the like.

The dimensions of the compartments are about 2 to about 8 inches, usually, about 3 to about 5 inches, and in one embodiment about 4 inches, by about 2 to about 4 inches, usually, about 2.5 to about 3 inches, and in one embodiment about 2.75 inches, by about 2 to about 8 inches, usually about 3 to about 5 inches, and in one embodiment about 3.8 inches. Of course, the dimensions of the compartments may vary depending on the size of the chamber and the like. The manifold components are usually fabricated from materials such as, for example, metal, plexiglass and the like.

Each of the gas inlets usually comprises at least one valve, which provides a level of flow control in the above system. Suitable valves may be, for example, metering valves such as, e.g., Swagelok needle valves and the like. Other valves that may be employed include any valve with an easily adjustable flow rate at moderate pressures and so forth. With the use of valves, the flow rate to each compartment may be controlled. Accordingly, the flow field in the chamber can be tuned to overcome resistance due to obstacles in the chamber. The obstacles may be, for example, robotic manipulators, print head assemblies, and so forth. As one might appreciate, such obstacles represent interference in the flow field of the gas. With a suitable valving system, the pressure of the gas can be increased to account for the interference from the obstacles. The valving system may be controlled by a suitable controller to adjust the pressure of the gas as any obstacles are moved into and out of the chamber. Such controllers include, for example, proportional vales, and so forth. The controller acts in response to an appropriate sensor that senses the level of pressure flow within the chamber, the ambient environment within the chamber, and so forth. Suitable sensors include, for example, low pressure manometers, pressure transducers, and the like.

A flow visualization system may be employed to monitor the flow of gas within the apparatus and ensure that all of the gas that enters the apparatus is subsequently removed through an exit and is replaced with fresh gas. Suitable flow visualization systems include, for example, helium or hydrogen bubble generators or smoke wire visualization during development, and the like.

In another approach for diffusively introducing the gas into the chamber, diffuser elements may be used in the compartments to provide for diffusion of the gas flow. In one embodiment the diffuser elements may take the form of raised surfaces within the compartments where the raised surfaces are tapered outwardly from the point source of the gas inlet to the area adjacent the outlet element. In this approach the diffuser elements within the compartments operate as a diffuser nozzle for diffusively introducing gas into the apparatus. The aforementioned arrangement of diffuser elements allows sufficient recovery of static pressure and uniform distribution of the flow of gas. The nature of the diffuser depends on a number of factors such as, for example, the pressure of the gas, and especially the diffuser's geometric properties and so forth. For use in the present invention, the diffuser elements generally have a rectangular cross section with a tapered angle of close to about 5 to about 12, usually, about 8 to about 10 degrees. Suitable other diffuser elements may be, for example, a series of screens, and the like. In this embodiment the dimensions of each of the compartments of the manifold are 4 inches by 2.75 inches by 3.8 inches deep. The diffuser elements are tapered desirably, from a point source to the full width of the compartment at the point of the outlet element.

As mentioned above, an outlet element is in fluid communication with the mechanism for diffusively introducing gas into the apparatus. The outlet element comprises a plurality of openings therein. The pressure differential behind the outlet element forces a series of small jets out of the plurality of openings. This results in further homogenization of the flow field of gas because the pressure drop across the outlet element depends on the driving pressure in the manifold. The greater the driving pressure is, the greater will be the pressure drop. As mentioned above, the pressure of the gas is usually recovered to near atmospheric in the diffuser. The pressure drop across the outlet element is usually much less than 1 psi.

The outlet element usually comprises about 5 to about 200 openings per square inch, more usually, about 10 to about 50 openings per square inch. The openings may be considered to be perforations in the outlet element (for relatively thin outlet elements) or bores through the outlet element (for relatively thick outlet elements). The dimensions of the outlet element are sufficient to cover much of a single wall of the reaction chamber. The thickness of the outlet element is primarily dependent on whether the outlet element functions also as a flow straightener. When the outlet element functions as a flow straightener, the outlet element is relatively thick, namely, about 0.25 to about 2 inches thick, usually, about 1 to about 1.5 inches thick, more usually, about 0.8 to about 1.2 inches thick. When the outlet element is employed in conjunction with a flow-straightening element, the outlet element is relatively thin, namely, about 0.02 to about 0.2 inches thick, usually, about 0.04 to about 0.125 inches thick, more usually, about 0.05 to about 0.07 inches thick. In general, the dimensions of the openings are dependent on the available prefabricated materials having the desired number of openings. In general, the dimensions of the openings are dependent on the balance between the diffusion quality needed and the change in pressure available. The dimensions of the openings are about 0.03 to about 0.25 inches in diameter, usually about 0.05 to about 0.125 inches in diameter.

The outlet element is fabricated from a material that does not absorb water to any significant extent. By this is meant that the material does not absorb enough water that can later be liberated from the surface and interfere with the reactions that are to be carried out in a reaction chamber comprising the present apparatus. The absorbance tolerance for the material depends, therefore, on the nature of the reaction, production time requirements that may be impacted by an extended drydown, flowrate through the element, which would dilute the released humidity, and so forth. Accordingly, the material should not appreciably absorb water or outgas any potential contaminants such as plasticizers or chemicals in adhesives. Suitable materials for the outlet element include, by way of example and not limitation, include stainless steel, e.g., electropolished stainless steel, a material coated with a hydrophobic surface, nickel plated aluminum, and so forth. The outlet element may be fabricated by techniques such as, for example, creating the features with conventional or electrical discharge machining, forming, punching, assembling or agglomerating small pieces by sintering, welding or brazing, using CNC machine tools, and the like, which are well known in the art.

As mentioned above, in one embodiment a flow-straightening element may be employed in fluid communication with the outlet element. The flow-straightening element provides for straightening of the direction of the flow and ameliorates any large-scale aspects surviving in the flow. Such large-scale aspects include large vortices generated by incoming flow in the rectangular manifolds or by separation of the fluid boundary layer from the tapered diffuser elements, and the like. The flow-straightening element comprises a plurality of cavities within the structure of the element. The percentage of open area within the flow-straightening element due to the presence of cavities is about 65 to about 95%, usually, about 90 to about 95%. In one approach the flow-straightening element is a honeycomb element comprising a plurality of honeycomb features. Typically, the number of such cavities or features is sufficient to achieve the percentage of open area indicated above. Usually, the ratio of the length of the honeycomb element to the honeycomb features is at least about 7 to 1. The flow-straightening element is generally fabricated from a material that does not absorb water to any significant extent. Such materials are set forth above.

The flow-straightening element and the outlet element are usually separated by a space. The thickness of the space is dependent on a number of factors such as, for example, the hole size in the diffuser element, the size of the flow straightener cell, flowrate and so forth. Usually, the space is about 1 to about 50 mm thick, more usually, about 2 to about 10 mm thick. The flow-straightening element and the outlet element may be mounted in the interior of the chamber in a number of ways to achieve the appropriate space therebetween. Suitable mounting means include brackets, indentations in the wall of the chamber, clamping between chamber components, and so forth.

As mentioned above, the chamber comprises a gas outlet through which gas exits the chamber. Usually, the gas outlet is in a wall of the chamber opposite the flow-straightening element. In one embodiment the gas outlet comprises a door in a wall of the chamber for ingress and egress of a device such as, for example, a mechanism for introducing a support into the chamber, a device for dispensing reagents such as, e.g., a print head mechanism, and the like. The dimensions of the door are sufficient to permit ingress and egress of a device as mentioned above. Accordingly, the dimensions of the door are dependent on, and are governed by, the dimensions of the particular device. The door is provided with a suitable pivoting mechanism to allow the door to be moved for ingress or egress of a device.

In one embodiment of the present apparatus, as mentioned above, the gas outlet is in a wall opposite the flow-straightening element. The gas outlet may be used for introduction of devices into the interior of the chamber. Such devices include, for example, robotic arms that carry supports, print heads, and the like. The gas outlet may take any one of a number of forms. In one embodiment, the gas outlet may be a door in the wall of the chamber. As discussed above, the door may be pivotally mounted in the wall in such a manner as to open to the extent necessary to allow gas to exit the interior of the chamber. When it is desired to introduce a device into the interior of the chamber, the door may be pivoted to a position such that there is sufficient space to introduce a device into the chamber. The gas outlet may also take the form of a membrane that comprises an opening such as a slit and the like and has sufficient elasticity to permit gas to exit the interior of the chamber and to allow introduction of a device into the chamber.

In this embodiment and in other embodiments, the walls of the chamber leading to the wall comprising the door may be gradually tapered. If the taper is too steep, the flow of gas may develop centrifugal instabilities along the wall of the chamber and, ultimately, to a decrease in homogenization of flow of gas through the chamber. The walls may be tapered about 0 to about 10 degrees, usually, about 5 to about 7 degrees.

Besides the wall opposite the outlet element that comprises a gas outlet, other walls of the chamber may comprise openings, which may be employed for ingress and egress of devices into and out of the chamber. For example, a mechanism for introducing a support into the interior of the chamber may enter the chamber through an opening in a bottom wall of the chamber. The opening may take the form of a membrane that comprises an opening such as a slit and the like. The membrane should have sufficient elasticity and form to permit introduction of a device into the chamber in a manner such that a seal is formed around the portion of the device that lies at the opening. The seal should be sufficient to minimize or exclude gas flowing though the chamber from exiting the chamber at the opening. The dimensions of the openings in the walls of the apparatus for insertion of various devices are dependent on the dimensions of the devices. In general, the opening in the wall should be sufficiently large enough to permit the device to be inserted into and removed from the chamber without interference with the sides of the opening. The openings should be no larger than necessary to permit the insertion and removal of the various devices.

The chamber cross-section is typically rectangular although other shapes may be employed depending on the nature of the operation to be performed in the interior of the chamber. For preparing supports having a plurality of biopolymer features thereon, the chamber cross-section is usually rectangular. The size of the chamber is dependent on the size of the devices such as, for example, printing heads, support holding mechanisms, cameras, and so forth, that are to be in the interior of the chamber during the steps involved in the synthesis of the biopolymer supports. In general, for synthesis of biopolymers on the surface of a support, the dimensions of the chamber should be sufficiently large enough so that the chamber can accommodate the support, the dispensing device or at least a portion thereof, as well as any elements necessary for the synthesis. The above factors govern the dimensions of the chamber for this purpose.

Typically, an apparatus for synthesis of biopolymer features has vertical symmetry to avoid any three-dimensional and/or re-circulating flow and to maintain a substantially steady and uniform flow, i.e., a controlled flow. Maintaining a controlled flow of gas within the chamber ensures that the boundary layer, i.e., the region of vortical flow near the surface where viscous effects are important, along the chamber walls remains attached to the surface as long as possible. By the term "substantially uniform flow" or "substantially controlled flow" is meant that the flow is controlled or uniform to the extent that little or no backflow occurs. In other words, the flow is controlled to the extent necessary to avoid entrainment of air outside the chamber. In one embodiment, the flow is substantially unidirectional so that any recirculating flow is minimized or eliminated. It should be noted that laminar, turbulent or fully developed flow (referring to the boundary layer conditions) may be used to establish an overall flow regime in the chamber. One consideration is that the flow may not be totally predictable in detail due to factors such as interference from devices inside the chamber. Furthermore, the streamlines of the clean flow issuing from a flow straightener or diffuser may not be very straight at the exit. The flow may be moving at a velocity, even recirculating with small enough amplitude, low enough frequency and/or energy, with respect to the size of and conditions at the exit so as not to entrain atmospheric air. The chamber works by excluding atmospheric air and the overall flow regime acts to usher flow predictably (at the "macro" level) out the exit, i.e., with minimal or no backflow or recirculation of atmospheric air into the chamber.

The walls of the chamber may be fabricated from materials such as, for example, plastics, glass, silicon dioxide, metals, lightweight composites, and so forth. It is within the purview of the invention that the walls are not fabricated from the same material. For some uses such as, for example, chambers for performing synthesis of biopolymers on supports, the material for fabrication of at least one wall is transparent such as, e.g., glass, transparent plastics, silicon dioxide, quartz, and the like. Many transparent plastic materials are hygroscopic and may allow moisture to penetrate the walls of the chamber by material diffusion. Such materials should be avoided if possible.

The edges and joints of the chamber walls are areas that are susceptible to entraining moisture from the high-humidity environment outside the chamber. The right angle formed by these joints may produce resident vortices near the joints. The joint must have an airtight seal. If the joint is not sealed adequately, any small gap between the abutted elements may fill with near stagnant gas. Moisture may diffuse into the stagnant gas in this gap because the velocities of the gas in the gap are very small and the humidity concentration gradients are very high across this region. To reduce the possibility of the above, angles in the interior of the chamber may be beveled. The material used to create the bevel can then be used as a seal. The angles of particular concern are those at the edges and joints of the interior of the chamber. In general, the angles are beveled to the extent necessary to substantially reduce or eliminate circulatory flow induced by stream-wise, resident vortices created in sharp corners, which results in stagnation of gas at or near these joints. Ideally, the angles are beveled at about 45 degrees or radiused although other angles may be employed.

The perimeter walls of the apparatus are usually constructed from a suitable material that gives structural strength to the apparatus so that various moving parts may be employed in conjunction with the apparatus. In addition, the structural strength must be sufficient to accommodate the gas pressures employed. Such materials include, for example, metal, plastic, glass, quartz, lightweight composites, and the like.

An example of an apparatus in accordance with the present invention is schematically represented in FIG. 1. Apparatus 20 is depicted and comprises four gas source lines 22a-22d. Each of gas source lines 22a-22d is in fluid communication with one of junctions 24a-24d, respectively. Also in fluid communication with junctions 24a-24d are opposing gas lines 26a and 28a, 26b and 28b, 26c and 28c, and 26d and 28d respectively. Gas flow into line 26a is controlled by valve 30a; gas flow into line 28a is controlled by valve 32a. Likewise, gas flow into line 26b is controlled by valve 30b; gas flow into line 28b is controlled by valve 32b; gas flow into line 26c is controlled by valve 30c; gas flow into line 28c is controlled by valve 32c; gas flow into line 26d is controlled by valve 30d; gas flow into line 28d is controlled by valve 32d. In this way gas entering each of junctions 24a-24d is opposed and directed down gas source lines 22a-22d, respectively, in a direction normal to the flow of gas into each of junctions 24a-24d. Such a situation tends to reduce gas velocity as the gas enters each of compartments 34a-34d, respectively, of manifold 34.

At the base of manifold 34 lies perforated plate 36 comprising a plurality of openings 38 therethrough. As explained above, pressure distribution behind perforated plate 36 forces a series of small jets out of openings 38, which results in a homogenization of flow through chamber 40. Space 42 lies between perforated plate 36 and flow straightener 44, which provides for further straightening of flow through chamber 40. Ideally, the direction of flow of gas exiting flow straightener 44 is substantially perpendicular to the horizontal axis of flow straightener 44 throughout chamber 40. Apparatus 20 further comprises outlet 46 in rear wall 48. By the term "substantially perpendicular" is meant that the relationship may vary from the perpendicular by no greater than 5%, usually, no greater than 2%.

In operation of apparatus 20, gas is introduced into gas lines 26a-26d and 28a-28d by opening the corresponding valves 30a-30d and 32a-32d. Gas entering along the aforementioned gas lines collides at junctions 24a-24d, respectively, and is directed into gas source lines 22a-22d, respectively. In this way the velocity of gas entering compartments 34a-34d, respectively, is reduced. The gas flows to perforated plate 36 and into space 42 through openings 38 in perforated plate 36. Gas flow through openings 38 results in flow homogenization as the gas enters flow straightener 44, which, as explained above, comprises a plurality of cavities through which the gas flows into chamber 40. Gas exiting flow straightener 44 then flows through chamber 40 in a direction that is substantially perpendicular to wall 48 of apparatus 20. Gas exits through gas outlet 46 and, as explained above, gas does not stagnate or re-circulate within chamber 40.

Figure 2:
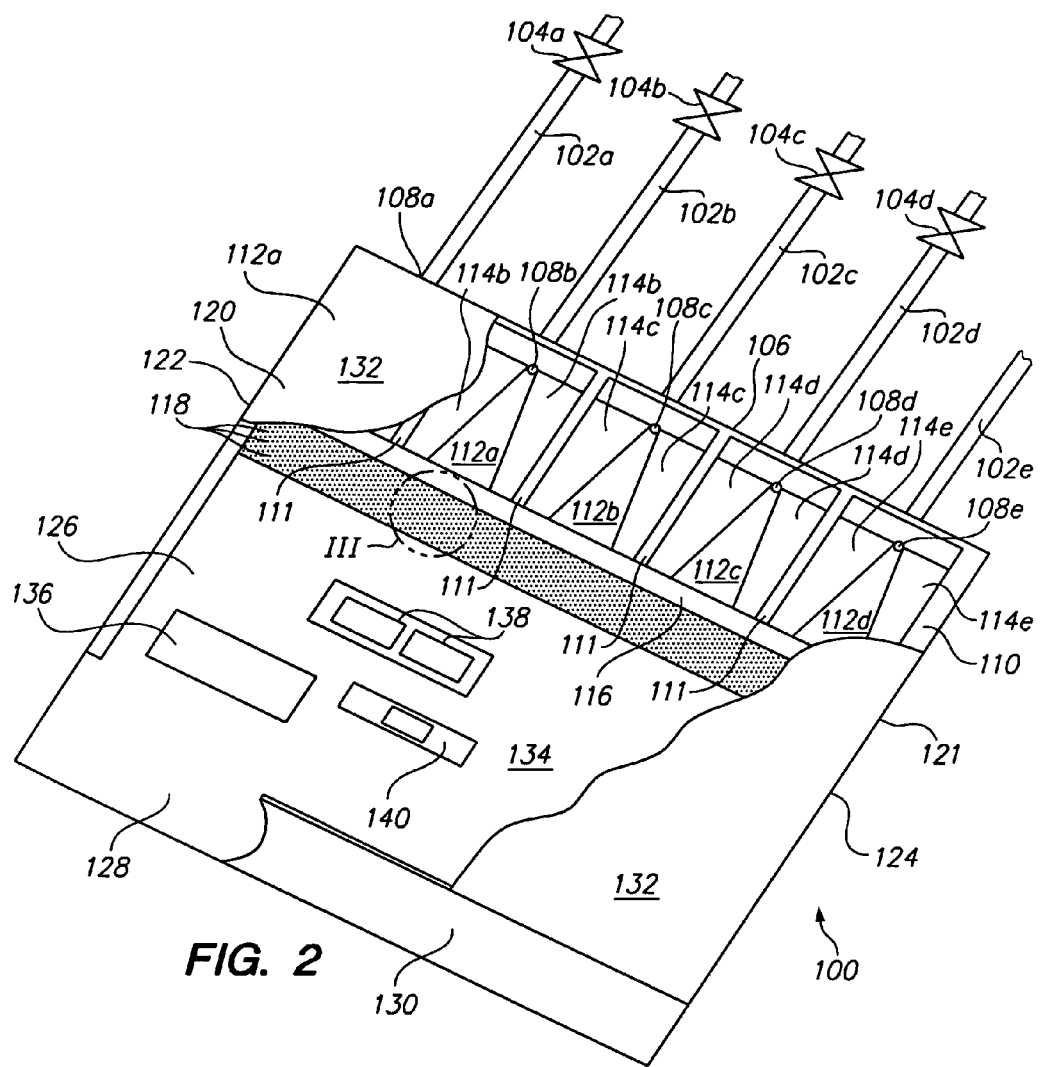
FIG. 2 is a schematic diagram in partial cutaway depicting another embodiment of an apparatus in accordance with the present invention.

Another embodiment of the present invention is depicted in FIG. 2. Apparatus 100 is depicted and comprises five gas inlets 102a-102e, each of which is in fluid communication with a respective valve 104a-104e. Each of the gas inlets is disposed in wall 106 of apparatus 100 and is attached at inlet points 108a-108e, respectively. Wall 106 is one wall of manifold 110, which comprises five compartments 112a-112e, each corresponding to a respective gas inlet 102a-102e. Opposite wall 106 is outlet element 116. Each compartment comprises diffuser elements 114, namely, 114a-114e. As can be seen, each diffuser element is tapered from a respective gas inlet point to the outlet element adjacent the compartment where the tapered portion at the outlet element spans the width of the compartment of the manifold. In this way maximum diffusion of the gas entering the compartment is achieved. This combination of diffuser elements within the compartment of the manifold may be viewed as a diffuser nozzle. The compartments are separated within manifold 110 by means of walls 111.

Figure 3:
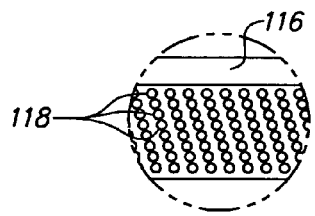
FIG. 3 is an expanded view of a portion of the outlet element of the embodiment of FIG. 2.

In the embodiment of FIG. 2, outlet element 116 comprises a plurality of openings 118 therethrough. A portion of outlet element 116 is shown in FIG. 3 to illustrate the vast number of openings 118 that may be present in outlet element 116. For the embodiment of FIG. 2, outlet element 116 also provides for flow-straightening of the gas. Accordingly, the thickness of outlet element 116 is significantly greater than the thickness of outlet element 36 of the embodiment depicted in FIG. 1. Outlet element 116 is secured to the base of walls 111 of manifold 110 by appropriate fasteners such as, for example, screws, weld joints, and the like. Furthermore, outlet element 116 is secured in indentations 120 and 121 in walls 122 and 124, respectively, of apparatus 100. As might be understood from the above description, outlet element 116 is affixed in a sealed manner in apparatus 100 such that gas passes into chamber 126 only through openings 118 in outlet element 116.

Apparatus 100 further comprises gas outlet 128 in wall 130 as well as top wall 132 and bottom wall 134. Opening 136 lies in bottom wall 134. As mentioned above, such an opening may be present so that a mechanism for introducing a support into the interior of the chamber may enter the chamber through an opening in a bottom wall of the chamber. Opening 136 may comprise a membrane with a slit (not shown) as discussed above. Top wall 132 may comprise a portion of a dispensing device (not shown) that protrudes into the interior of chamber 134. The dispensing device is seated in top wall 132 so that gas does not escape from chamber 126 through the area surrounding the dispensing device. Also shown in bottom wall 134 are camera ports 138 for aligning wafers as they are placed into the chamber and vacuum chucks 140 for transferring substrates into and out of the anhydrous environment.

In operation of apparatus 20, gas is introduced into gas lines 102a-102e by operation of corresponding valves 104a-104e. Gas enters each of compartments 112a-112e and is diffused from point source 108a-108e by diffuser elements 114a-114e. The diffused gas enters outlet element 116. Gas flow through openings 118 of outlet element 116 results in flow homogenization and flow-straightening. Gas exiting outlet element 116 then flows through chamber 40 in a direction that is substantially perpendicular to wall 130 of apparatus 100. Gas exits through gas outlet 128 and, as explained above, gas does not stagnate or re-circulate within chamber 126.

The present devices and methods may be employed in the synthesis of a plurality of chemical compounds on supports. Usually, the chemical compounds are those that are synthesized in a series of steps such as, for example, the addition of building blocks, which are chemical components of the chemical compound. Examples of such building blocks are those found in the synthesis of polymers. The invention has particular application to the in situ synthesis of biopolymers such as polynucleotides, for example, oligonucleotides. Such methods usually require a step of dispensing reagents to discrete sites on the surface of a support. The present apparatus are well-suited for performing such steps, which usually require a controlled environment such as a low humidity environment.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a nonnaturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The support or substrate to which a plurality of chemical compounds is attached is usually a porous or non-porous water insoluble material. The support can have any one of a number of shapes, such as strip, plate, disk, rod, particle such as a bead, and the like. The support can be hydrophilic or capable of being rendered hydrophilic or it may be hydrophobic. The support is usually glass such as flat glass whose surface has been chemically activated for binding thereto or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly(ethylene terephthalate), nylon, poly(vinyl butyrate), etc.; either used by themselves or in conjunction with other materials; ceramics, metals, and the like. Preferably, for packaged arrays the support is a non-porous material such as glass, plastic, metal or the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful in the synthesis of arrays of biopolymers. A biopolymer is a polymer of one or more types of repeating units relating to biology. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one, two or three dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present devices and methods may be used in the synthesis of polypeptides. The synthesis of polypeptides involves the sequential addition of amino acids to a growing peptide chain. This approach comprises attaching a first amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Sciences* 232, 341-347. After polypeptide synthesis is complete, acid is used to remove the remaining terminal protecting groups.

The present invention has particular application to the synthesis of arrays of chemical compounds on a surface of a support. Typically, methods and apparatus of the present invention generate or use an array assembly that may include a support carrying one or more arrays disposed along a surface of the support and separated by inter-array areas. Normally, the surface of the support opposite the surface with the arrays does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 $cm^2$ or even less than 10 $cm^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. These areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interarray areas and interfeature areas, when present, could be of various sizes and configurations.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotide arrays.

The fluid dispensing device normally includes a reagent source or manifold as well as reagent lines that connect the source to fluid dispensing nozzles and the like. Any system may be employed that dispenses fluids such as water, aqueous media, organic solvents and the like. The fluid dispensing device may comprises a pump for moving fluid and may also comprise a valve assembly and a manifold as well as a means for delivering predetermined quantities of fluid to the surface of a support. The fluids may be dispensed by any of the known techniques such as those mentioned above. Any standard pumping technique for pumping fluids may be employed in the dispensing device. For example, pumping may be by means of a peristaltic pump, a pressurized fluid bed, a positive displacement pump, e.g., a syringe pump, and the like.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281-285, 1985; Itakura, et al., *Ann. Rev. Biochem.* 53: 323-356; Hunkapillar, et al., *Nature* 310: 105-110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate back side and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention the step of dispensing reagents to the surface of a support may be carried out using an apparatus in accordance with the present invention. The primary application of the present apparatus is dispensing monomer addition reagents to discrete sites on the surface of a support. In addition, under certain circumstances other reactions may be carried out such as, for example, phosphoramidite monomer addition, modified phosphoramidite addition, other monomer additions, addition of a polymer chain to a surface for linking to monomers, and so forth. However, other steps that may be conducted using the present apparatus include by way of illustration and not limitation, washing of the surface of the support prior to or after a reaction, protection and deprotection of certain functionalities on the surface, oxidation or reduction of functionalities on the surface such as, e.g., oxidation of a phosphite group to a phosphate group, removal of protecting groups, blocking of sites to prevent reaction at such site, capping of sites that did not react with a phosphoramidite reagent, deblocking, and so forth. It should be noted that, while the discussion herein may be directed to the synthesis of biopolymers, this is by way of illustration and not limitation. The apparatus of the invention may be used for other synthetic reactions as will be suggested to those skilled in the art in view of the disclosure herein.

The reagents that may be dispensed include, for example, a chemical reagent that forms part of the chemical compound by addition thereto, wash fluids, oxidizing agents, reducing agents, blocking or protecting agents, unblocking or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

The dimensions of the support may vary depending on the nature of the support. For example, the support may be one on which a single array of chemical compounds is synthesized. In this regard the support is usually about 1.5 to about 5 inches in length and about 0.5 to about 3 inches in width. The support is usually about 0.1 to about 5 mm, more usually, about 0.5 to about 2 mm, in thickness. A standard size microscope slide is usually about 3 inches in length and 1 inch in width. Alternatively, multiple arrays of chemical compounds may be synthesized on the support, which is then diced, i.e., cut, into single array supports. In this alternative approach the support is usually about 5 to about 8 inches in length and about 5 to about 8 inches in width so that the support may be diced into multiple single array supports having the aforementioned dimensions. The thickness of the support is the same as that described above. In a specific embodiment by way of illustration and not limitation, a wafer that is 6⅝ inches by 6 inches is employed and diced into one inch by 3 inch slides.

Figure 4:
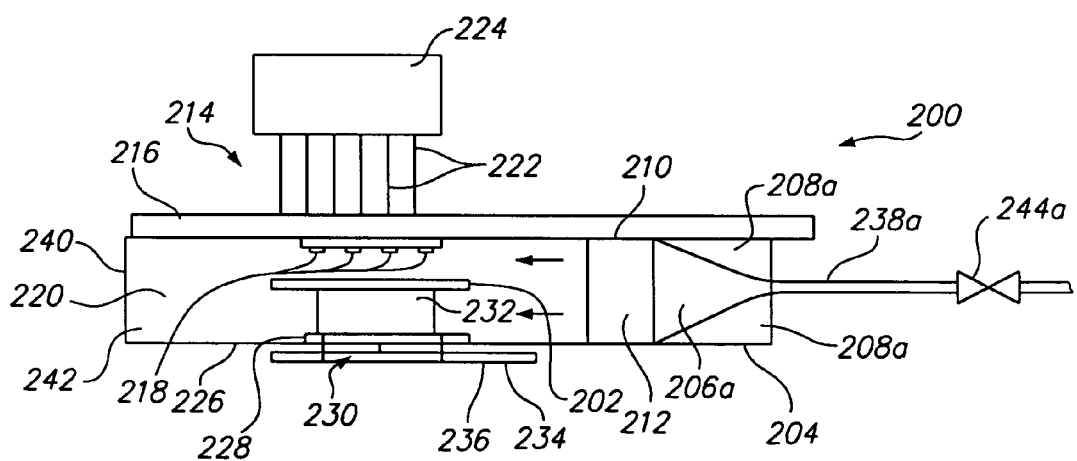
FIG. 4 is a schematic diagram depicting another embodiment of an apparatus in accordance with the present invention.

Another embodiment of the present invention is an apparatus for manufacturing an array of biopolymers on a support. One such apparatus is depicted in FIG. 4 by way of illustration and not limitation. Apparatus 200 may be employed for manufacturing an array of biopolymers on support 202. The apparatus comprises a manifold 204 comprising five compartments 206a-206e as in the embodiment of FIG. 2. The compartments each comprise diffuser elements 208a-208e. Perforated element 210 is in fluid communication with manifold 204 and comprises a plurality of openings 212. Device 214 for dispensing reagents for synthesizing an array of biopolymer features on support 202 is mounted in top wall 216 of apparatus 200 so that dispensing nozzles 218 protrude into the interior of chamber 220. The remainder of dispensing device 214, which includes reagent source lines 222 and reagent source manifold 224, are mounted outside of chamber 220. Device 214 is mounted in wall 216 in a sealed manner so that gas does not escape from chamber 220 through the area around the opening in wall 216 in which dispensing nozzles 218 are mounted. Bottom wall 226 of apparatus 200 has an opening 228 through which robot arm 230 may insert support 202 into the interior of chamber 220. Opening 228 comprises a suitable elastomeric membrane through which the support may be inserted into chamber 220 in a manner such that a sufficient seal exists to prevent gas from exiting through opening 228. Support 202 is secured to holding element 232.

Robot arm 230 also comprises an x,y-stage 234 and a theta stage 236 for moving holding element 232 with support 202 thereon into various positions relative to dispensing nozzles 218 so that reagents may be dispensed to different discrete sites on support 202. Gas is introduced into apparatus 200 through gas inlets 238a-238e, each of which is in fluid communication with a respective compartment 206a-206e of manifold 204 and with a respective gas valve 244a-244e. The gas is diffused in the compartments and undergoes homogenization and flow-straightening as it passes through outlet element 210 into chamber 220. The direction of flow of the gas is substantially perpendicular to wall 240 of apparatus 200. The gas exits chamber 220 through gas outlet 242 in wall 240. The functioning of the valves, robot arms, dispensing device, and so forth may be controlled by suitable controllers to carry out a predetermined sequence of events. The controllers may be under computer control to further automate the process and instructions may be introduced into the computer by means of suitable software programs. The controllers are also instructed as to the sequence of nucleotides that is to be employed to prepare the desired oligonucleotides on the surface of support 202. A unique sequence may be specified at each site on the support.

In one embodiment of a method for synthesizing a plurality of biopolymers on a support in accordance with the present invention, the support is introduced into a reaction chamber, which has a positive and substantially uniform laminar flow of gas through the reaction chamber. The gas exits the reaction chamber through a gas outlet in a direction that is the same as the laminar flow. Discrete sites on the surface of the support are activated for attachment of a biopolymer precursor. The support and a dispensing system for dispensing reagents for the synthesis of the biopolymers are brought into a dispensing position relative to the activated discrete sites on the surface. Reagents are dispensed to the discrete sites. The support and/or the dispensing system are removed from the relative dispensing position. Optionally, the above steps are repeated until the biopolymer is formed. The method has particular application to the in situ synthesis of an array of biopolymers on the surface of a support.

The aforementioned apparatus may be employed in the automated manufacture of an array of oligonucleotides on the surface of support 202 consistent with the above-described method. Phosphoramidite synthetic methods may be employed in conjunction with the aforementioned apparatus 200 to provide a controlled environment within the interior of chamber 220. The surface of support 202 may be activated to provide for a first monomer in the synthesis chain already present on the surface of support 202. Support 202 is loaded into holding element 232. A controller first opens valves 244a-244e so that gas enters manifold 204 and flows though outlet element 210 into chamber 220 to create a controlled environment within the interior of chamber 220. A controller directs the movement of robotic arm 230 so that support 202 is moved into the interior of chamber 220 so that the activated surface of support 202 is in proper orientation with respect to dispensing nozzles 218. A controller directs the movement of x,y-stage 234 and theta stage 236 with respect to dispensing nozzles 218 for precise placement of spots of reagents at particular sites on support 202.

The reagents are delivered to the individual sites using the dispensing device 214 where the dispensing nozzles 218 are at a fixed location and the support is moved with the above stages. Since the surface of support 202 is activated with a first monomer in the synthesis and the first monomer usually comprises a protection group, the protection group must be removed prior to the addition of a second monomer. This exposes an activated moiety on the monomer, which reacts with the next phosphoramidite reagent that is delivered to the surface of support 202 by means of dispensing nozzles 218. The next dispensed phosphoramidite reagent reacts only at specific discrete sites on the surface of support 202.

During the synthesis, there are a number of instances where the surface of the support must be washed to remove unreacted or unwanted materials. Furthermore, deprotection agents are added to remove protection groups and oxidizing agents are added to oxidize certain groups such as phosphite groups to phosphate groups. These steps may be carried out using dispensing device 214 to dispense wash buffers or deprotection agents, as the case may be, to the surface of support 202. On the other hand, robot arm 230 is activated to remove support 202 from chamber 220 and move support 202 to a station for washing its surface or to a station for administering deprotection or other agents. Robot arm 230 then moves support 202 back through opening 228 into the interior of chamber 220. A controller again directs the movement of x,y-stage 234 and theta stage 236 with respect to dispensing nozzles 218 for precise placement of spots of reagents at particular sites on support 202. The aforementioned steps are continued under the control of the various controllers until the desired oligonucleotides are synthesized in an array on support 202.

During the various steps in the synthesis of the oligonucleotides, the temperature of the reactions requires control to facilitate the reactions. Usually, the reactions require elevated temperatures in order for the reactions to occur. In one approach the temperature of the interior of the chamber may be controlled by controlling the temperature of the gas that is introduced into apparatus 200. In another approach, holding element 232 may be equipped with heating elements to provide for temperature control. In yet another approach, the temperature of the reagents that are dispensed through device 214 may be controlled as the reagents are dispensed to the surface of support 202.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

As mentioned above, the apparatus functions and the methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FORTRAN and C++. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) introducing pressured gas into a manifold of an apparatus wherein the manifold comprises a plurality of compartments and wherein the gas is introduced in a manner such that the gas velocity is diffused and the gas traverses the interior of an apparatus, including a chamber thereof, in a flow straightened manner to a gas outlet at an end of the apparatus opposite the manifold, (ii) securing a support to a support holding element, (iii) placing the support and the support holding element into a chamber of the apparatus, (iv) moving the support relative to dispensing nozzles of a reagent dispensing device, (v) dispensing monomeric reagents to predetermined sites on the surface of the support, (vi) moving the support for applying reagents other than the monomeric reagents to the surface of the support, (vii) optionally, repeating the above steps until the array of biopolymers is formed, and (viii) removing the support from the chamber of the apparatus. Another aspect of the present invention is a computer program product comprising a computer readable storage medium having a computer program stored thereon which, when loaded into a computer, performs the aforementioned method.

The above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. An apparatus for manufacturing an array of biopolymers on a support, said apparatus comprising:
   (a) a manifold comprising at least two compartments, each of said compartments being in fluid communication with a respective gas inlet,
   (b) a perforated element in fluid communication with said manifold, said perforated element being substantially perpendicular to said gas inlets,
   (c) a chamber in fluid communication with said perforated element, said chamber comprising an opening in a wall thereof and a gas outlet in a wall thereof that is perpendicular to said gas inlets,
   (d) a device for dispensing reagents for synthesizing said array of biopolymers on a support, at least a portion of said device being within said chamber, wherein said device for dispensing reagents is a drop dispensing device for dispensing individual drops of said reagents to predetermined features on said support, and
   (e) a mechanism for moving said support into and out of said chamber through said opening and for positioning said support relative to said device for dispensing reagents.

2. An apparatus according to claim 1 wherein said perforated element comprises about 5 to about 200 perforations per square inch.

3. An apparatus according to claim 1 wherein said perforated element is about 0.2 to about 2 inches thick and the diameter of each of said perforations is about 0.03 to about 0.25 inches.

4. An apparatus according to claim 1 wherein said perforated element is 0.02 to about 0.2 inches thick and said apparatus comprises a honeycomb element in fluid communication with said perforated element.

5. An apparatus according to claim 1 wherein said opening is in a wall of said chamber opposite to said perforated element.

6. An apparatus according to claim 5 wherein the walls of said chamber leading to said wall comprising said opening are tapered.

7. An apparatus according to claim 1 wherein said mechanism of (e) is a mechanism for moving a support relative to said drop dispensing device.

8. An apparatus according to claim 1 wherein said gas inlets each comprise a separate T-junction such that gas enters each of said gas inlets in opposing directions, which are substantially normal to the direction in which gas exits said manifold.

9. An apparatus according to claim 1 wherein said manifold comprises at least four compartments.

10. An apparatus according to claim 1 wherein said chamber has vertical symmetry.

11. An apparatus according to claim 1 wherein the angles in the interior of said chamber are beveled.

12. An apparatus according to claim 1 further comprising a controller for controlling the movement of said mechanism for moving said support.

13. An apparatus according to claim 12 wherein said mechanism is a robotic arm.

14. An apparatus according to claim 1 wherein said opening comprises a door for ingress and egress of said support.

15. An apparatus according to claim 14 wherein the dimensions of said door are sufficient to permit ingress and egress of said mechanism for moving said support.

16. An apparatus according to claim 14 wherein the dimensions of said door are sufficient to permit ingress and egress of said device for dispensing reagents.

17. An apparatus according to claim 14 wherein said opening is opposite to said perforated element.

18. An apparatus according to claim 1 comprising at least four gas inlets.

19. An apparatus according to claim 18 wherein each of said gas inlets comprises a valve.

20. An apparatus according to claim 18 wherein said gas inlets are designed to introduce gas into said manifold at a pressure of about 60 to about 80 psi.

21. An apparatus according to claim 1 wherein each compartment comprises one or more elements for diffusing said gas within said compartment.

22. An apparatus according to claim 1 wherein said device for dispensing reagents is a pulse jet device.

23. An apparatus for manufacturing an array of biopolymers on a support, said apparatus comprising:
(a) a manifold comprising at least two compartments, each of said compartments being in fluid communication with a respective gas inlet, each gas inlet being in fluid communication with a gas inlet source and each gas inlet comprising opposing gas lines oriented to provide gas from two directions to each gas inlet so that gas from each direction collides and enters said gas inlet in a direction that is substantially normal to the direction in which the gas flows through the gas inlets and enters said manifold wherein fluid communication of each of said gas inlets with said gas inlet source is independent of one another,
(b) a perforated element in fluid communication with said manifold,
(c) a chamber in fluid communication with said perforated element, said chamber comprising an opening in a wall thereof,
(d) a device for dispensing reagents for synthesizing said array of biopolymers on a support, at least a portion of said device being within said chamber, and
(e) a mechanism for moving said support into and out of said chamber through said opening and for positioning said support relative to said device for dispensing reagents.

24. An apparatus according to claim 23 further comprising a honeycomb element in fluid communication with said perforated element.

25. An apparatus according to claim 23 wherein said opening is in a wall of said chamber opposite to said perforated element and wherein the walls of said chamber leading to said wall comprising said opening are tapered.

26. An apparatus according to claim 23 wherein said device for dispensing reagents is a drop dispensing device.

27. An apparatus according to claim 23 wherein said device for dispensing reagents is a pulse jet device.

28. An apparatus according to claim 23 wherein the device for dispensing reagents comprises a plurality of dispensing nozzles that protrude into said chamber.

29. An apparatus according to claim 23 wherein said chamber has vertical symmetry.

30. An apparatus according to claim 23 wherein the angles in the interior of said chamber are beveled.

31. An apparatus according to claim 23 further comprising a controller for controlling the movement of said mechanism for moving said support.

32. An apparatus according to claim 23 wherein said opening comprises a door for ingress and egress of said support.

33. An apparatus according to claim 32 wherein said opening is opposite to said perforated element.

34. An apparatus according to claim 23 wherein each of said opposing gas lines of said gas inlets comprises a separate valve.

35. An apparatus according to claim 23 wherein each compartment comprises one or more elements for diffusing said gas within said compartment.

36. An apparatus for manufacturing an array of biopolymers on a support, said apparatus comprising:
(a) a manifold comprising at least two compartments, each of said compartments being in fluid communication with a respective gas inlet and each of said compartments comprising raised surfaces within the compartments,
(b) a perforated element in fluid communication with said manifold, said raised surfaces of each of said compartments being tapered outwardly from said respective gas inlet to an area adjacent said perforated element,
(c) a chamber in fluid communication with said perforated element, said chamber comprising an opening in a wall thereof,
(d) a pulse jet device for dispensing reagents for synthesizing said array of biopolymers on a support, at least a portion of said device being within said chamber wherein said pulse jet device dispenses individual drops of said reagents to predetermined features on said support, and
(e) a mechanism for moving said support into and out of said chamber through said opening and for positioning said support relative to said device for dispensing reagents.

37. An apparatus according to claim 36 wherein said chamber has vertical symmetry.

38. An apparatus according to claim 36 further comprising a flow-straightening element in fluid communication with said perforated element.

39. An apparatus according to claim 36 wherein the pulse jet device for dispensing reagents comprises a plurality of dispensing nozzles that protrude into said chamber.

40. An apparatus according to claim 36 further comprising a controller for controlling the movement of said mechanism for moving said support.

41. An apparatus according to claim 36 wherein said opening is opposite to said perforated element.

42. An apparatus according to claim 36 wherein said manifold comprises at least four compartments.

* * * * *